United States Patent

[11] 3,549,154

| [72] | Inventor | David W. Jones |
| | | East Northport, N.Y. |
| [21] | Appl. No. | 819,864 |
| [22] | Filed | Apr. 28, 1969 |
| [45] | Patented | Dec. 22, 1970 |
| [73] | Assignee | G.E. Conover & Co., Inc. |
| | | Fairfield, N.J. |
| | | a corporation of New Jersey |
| | | Continuation of Ser. No. 587,756, Oct. 19, 1966, abandoned |

[54] MOTION TRANSMITTING SYSTEM WITH SEAL PROTECTION
5 Claims, 3 Drawing Figs.

[52] U.S. Cl. .................................................... 277/24,
277/165; 15/210
[51] Int. Cl. ..................................................... F16j 15/00
E21b 33/08
[50] Field of Search ........................................ 277/24,
165, 188, 178; 15/210.2, 256.5

[56] References Cited
UNITED STATES PATENTS

| 2,368,137 | 1/1945 | Harmon ........................ | 277/24 |
| 2,776,173 | 1/1957 | Rudy ............................ | 277/24UX |
| 2,935,365 | 5/1960 | Dega ............................ | 277/165 |
| 3,057,630 | 10/1962 | Sneed........................... | 277/165 |
| 3,147,983 | 9/1964 | Neuman et al................ | 277/50 |
| 3,380,745 | 4/1968 | Kudlaty........................ | 277/165X |

FOREIGN PATENTS

| 251,426 | 2/1964 | Australia..................... | 277/24 |

Primary Examiner—Samuel B. Rothberg
Attorney—Sandoe, Hopgood & Calimafde

ABSTRACT: A motion-transmitting system with a piston and piston rod passing through the "crank end" of a cylinder has working fluid under pressure on the crank side of the piston. The rod passes through an end wall of a cylinder which encloses a seal for the working fluid and a seal protector beyond the seal having a body portion of substantial mass from which a lip projects in a direction away from the seal. A sharp raking corner of the lip hugs and scrapes the motion transmitting rod and the lip has a grooved midportion to provide flexibility and for holding a ring that maintains radial pressure on the lip.

FIG. I.

PRIOR ART

INVENTOR
David W. Jones
BY
ATTORNEYS.

MOTION TRANSMITTING SYSTEM WITH SEAL PROTECTION

RELATED PATENT APPLICATION

This application is a continuation of application Ser. No. 587,756, filed Oct. 19, 1966, and now abandoned.

SUMMARY OF THE INVENTION

This invention relates to a motion-transmitting system in which movement of a piston is transmitted by a piston rod through a crank end of a cylinder containing working fluid and sealed by sealing means that need protection against entry of dirt, dust and other foreign matter into the seal and into reciprocating hydraulic or pneumatic apparatus.

It is an object of the invention to provide a protector for preventing damage to the seal by dirt and other foreign matter on reciprocating hydraulic or pneumatic devices which must be sealed against the escape of pressure and, at the same time, to prevent the entry of dirt or other foreign matter into the fluid of such devices. This dirt or foreign matter may be accumulated on the piston rod during movement of part of the rod outside of the cylinder and beyond the fluid seal.

While useful over a broad field, the invention is especially useful for aircraft landing gear actuators, and especially helicopters, that operate in terrain where there are no paved landing strips, and where the motion transmitting system of the landing gear is subject to exposure to sand and other abrasive forms of foreign matter; and motion-transmitting rods are subject to frequent transverse loading, which tends to open up any clearance unevenly around the rods.

It is an object of this invention to provide apparatus that protects a seal by scraping foreign matter from a reciprocating rod without risk of scoring the rod; and another object is to combine such apparatus with sealing means that provide for lubrication of a motion-transmitting rod and scraper in a manner that greatly increases the useful life of the scraper and seal without reducing its effectiveness.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic sectional view of a seal around a piston-operated actuator of the prior art;

DESCRIPTION OF PREFERRED EMBODIMENT

Figure 2:
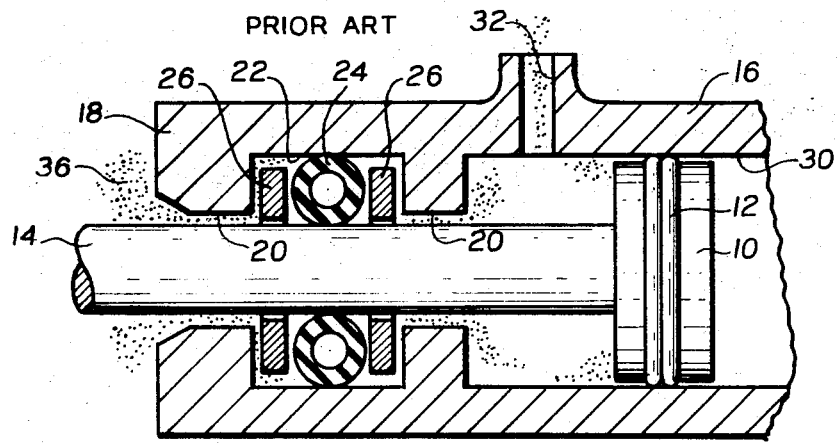
FIG. 2 is a diagrammatic sectional view of a piston rod and cylinder equipped with a seal and scraper made in accordance with this invention.

FIG. 1 shows a piston 10 with rings 12 and a piston rod 14. The piston moves in a cylinder 16 having an end wall 18 with an opening 20 through which the piston rod 14 extends. The sidewalls of the opening 20, for a substantial portion of their axial length, are slightly larger in diameter than the diameter of the piston rod 14 so as to provide a running clearance for the reciprocating piston rod. This clearance is exaggerated in FIG. 1 for clearer illustration. There is a circumferential groove 22 in the wall of the opening 20 for holding a seal. The seal includes a conventional elastomeric compression device with backup rings 26 on each side of it. The device 24 is under some compression, in accordance with conventional practice.

The piston rings 12 slide along a wall 30 of the cylinder 16, and there is a port 32 through the side of the cylinder 16 for entrance and exhaust of working fluid to and from the cylinder 16.

Dust with foreign matter or abrasive buildup of particles, represented by the stippling in FIG. 1, gathers at the outer end of the opening 20 and combines with the lubricating oil in the rod 14 and in the bearing, to form a paste. This paste is abrasive if the dirt contains sand or other abrasive particles; and the wedging action of the piston rod pulling the paste into the opening 20 sometimes scores the piston rod and sometimes jams the rod in the bearing in the opening 20.

Foreign matter 36 which passes beyond the first part of the opening 20, collects around the seal in the groove 22, and such collection of foreign matter in the seal can cause local leakage paths past the seal. Also, accumulation of abrasive foreign matter between the backup rings 26 and the rod 14 will sometimes score the rod.

Eventually the foreign matter works its way past the seal in the groove 22 and is carried by the rod 14 into the clearance between the rod and the portion of the opening 20 beyond the seal where abrasive foreign matter can score the rod or bearing surface. Any foreign matter which passes through the clearance gap between the rod 14 and the inner end of the bearing in the opening 20, enters the main body of fluid in the cylinder 16 and abrasive particles in the fluid can result in scoring of the cylinder wall 30.

Where a construction such as shown in FIG. 1 is used, this rod 14 is subject to transverse loading at various times and this causes the clearance around the rod 14 to be greater at some parts of the circumference than at others and facilitates the leakage of dirt into the bearings. Thus, entry of foreign matter into the working fluid is facilitated and these particles, when abrasive, can greatly reduce the efficiency of the piston by scoring the cylinder so that the piston leaks, and can damage the entire system by clogging filters and scoring the metal of other components in the system which are in the working fluid circulation system.

FIG. 2 shows a cylinder 46 having an end wall 48 with an opening 50 through which a piston rod 52 extends. It will be understood that there is a piston in the cylinder 46 on the piston rod 52, as in FIG. 1, but the larger scale in FIG. 2 does not show the part of the piston rod which connects with the piston and a repetition of the illustration is unnecessary since the construction is the same as in FIG. 1.

The surface of the opening 50 provides a bearing in which the rod 52 reciprocates and there is a running clearance between these bearing surfaces and the rod 52, as in FIG. 1. The cylinder 46 also has a circumferential groove 22' with a seal comprising an O-ring 24' and Teflon backup rings 26' which are the same as the corresponding parts shown in FIG. 1.

In order to prevent the entry of foreign matter into the cylinder 46 and the bearings in the opening 50, the construction shown in FIG. 2 is equipped with a seal-protecting scraper 56. This scraper has a body portion 60 and has a scraper lip 62 extending from the body portion 60 and preferably of one-piece construction with the body portion.

Figure 3:
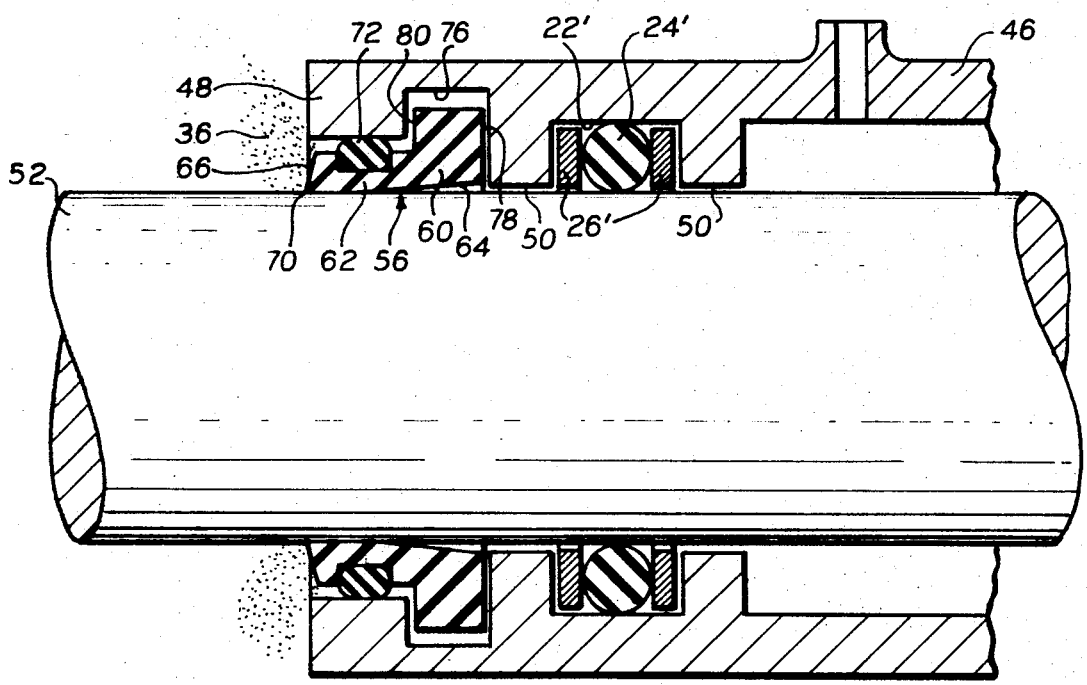
FIG. 3 is an enlarged, fragmentary, sectional view showing the scraper of FIG. 2 in its undistorted condition.

The scraper 56 is made of softer material than the rod 52 so that it cannot score the rod. The scraper has a center opening 64 through which the rod 52 extends and this center opening has a slight taper so that the diameter of the opening 64 decreases toward the lip end of the scraper. As shown in FIG. 3, the taper of the opening 64 is 5° with respect to the longitudinal axis of the scraper before the scraper is placed on the rod, i.e., before there has been any distortion of the lip.

The minimum diameter of the opening 64, in the undistorted scraper 56, is slightly less than the outside diameter of the piston rod with which the scraper is intended to be used. The scraper is made of a material which is nonabrasive, self-lubricating, hard enough to resist and remove particle buildup on the shaft and have some resilience. Typical of the materials used are TFE, FEP, nylon, Delrin, polyethylene, graphite and in special extreme cases, bearing bronze and oilite.

When the scraper 56 is placed on the piston rod 52, the lip 62 is increased slightly in diameter so that the inside diameter of the lip 62 is equal to the outside diameter of the rod and the lip 62 hugs the rod closely. The lip 62 has a sloping end face 66 which slopes toward the body portion of the scraper as it extends radially outward away from the piston rod 52. This end face 66 meets the inside surface of the opening 64 at a sharp corner 70 which scrapes foreign matter 36 from the rod 52 during relative longitudinal movement of the rod 52 and the scraper 56.

In order to prevent the entrance of foreign matter into the opening through the end wall 48 around the outside of the scraper 56, there is an elastometric compression device, such as an O-ring 72 in a circumferential groove in the peripheral surface of the sealing lip 62. This O-ring 72 is under substantial squeeze so as to form a barrier against entry of foreign matter around the outside of the scraper 56. The O-ring 72 serves another important function, however, in that it provides a radial pressure inward on the lip 62 so as to increase the pressure of the lip 62 against the rod 52. Because of the location of the ring 52 close to the end face 66 of the scraper 56, the pressure of the ring 72 is applied where it is especially effective for maintaining a high local pressure between the lip 62 and the rod 52. It should also be noted that the elastomeric characteristics of the ring 72 are effective for keeping the pressure of the lip 62 against the rod 52 substantially uniform under extremely long periods of use, even though some wear occurs on the surface of the lip 62 which is in contact with the rod 52.

The body portion 60 of the scraper 56 is of substantially larger diameter than the lip 62 and extends into an inside circumferential groove 76 in the opening through the end wall 48 of the cylinder. The body portion 60 has an end wall 68 which abuts against one side of the groove 76 to prevent longitudinal movement of the scraper 56 toward the right in FIG. 2. A shoulder 80, on the body portion 60, abuts against the other side of the groove 70 to limit longitudinal movement of the scraper 56 toward the left in FIG. 2.

In the construction illustrated, the groove 76 is somewhat wider, in an axial direction, than the body portion 60 to provide clearance for ease of manufacture with an allowable tolerance on the fabricated parts.

The inside diameter of the opening through the body portion 60 of the scraper is of somewhat larger diameter than the shaft 52, as previously explained, and this permits lubricant to be trapped in the tapered clearance between the shaft and the body portion of the scraper so that the shaft 52 is lubricated for its passage through the lip 62 when traveling toward the left in FIG. 2. The elastometric compression device is preferably made of a material which is resilient, has a hardness of from 70 to 90 duro and is compatible with environmental media and the media being sealed in the cylinder.

The preferred embodiment of the invention has been illustrated and described, but changes and modifications can be made and some features can be used in different combinations without departing from the invention as defined in the claims.

I claim:

1. In a motion-transmitting system, a cylinder for containing working fluid under pressure, a piston in the cylinder, a piston rod through which motion is transmitted between the piston and a location outside of the cylinder, a cylinder end wall having an opening through which the piston rod extends, part of the opening through said end wall constituting a bearing for the piston rod, a working fluid seal in a groove formed in said wall along said opening near the cylinder end thereof and extending around the full circumferential of the piston rod, and a seal protector in the opening on the side of the seal remote from the cylinder, the seal protector being in front of the bearing and at a location beyond which the rod is exposed to dust, dirt and other foreign matter, the seal protector being made of elastomeric material with a body portion at its rearward end toward the cylinder and a lip of substantially less radial thickness than the body portion and extending from the front of the body portion forward away from the cylinder, the seal protector having a center opening through which the piston rod extends, said center opening being tapered to a smaller diameter toward its forward end, the forward end of the lip hugging the piston rod and having a raking corner that scrapes dirt and other foreign matter from the piston rod when the rod is reciprocating in a direction toward the cylinder, a circumferential groove in the lip back from the forward end of the lip and reducing a radial thickness of the lip back from said forward end, and an elastomeric ring in the groove of the lip exerting pressure on the lip and urging the lip, including the raking corner at the forward end thereof, toward the piston rod.

2. The combination described in claim 1 characterized by the elastomeric sealing ring being an O-ring in said circumferential groove.

3. The combination described in claim 1 characterized by the seal protector being made of material softer than the piston rod and of a hardness of 70—90 duro.

4. The combination described in claim 1 characterized by a circumferential groove in the wall surface forming said opening through the cylinder wall and into which the body portion of the seal protector extends for holding the seal protector against longitudinal movement with the piston rod, the diameter of the opening being correlated with the diameter and resilience of the elastomeric material of the seal protector for insertion of the body portion of the seal protector into the circumferential groove in the wall surface forming said opening without removing any side of said opening.

5. The combination described in claim 4 characterized by the elastomeric ring in the circumferential groove being an O-ring constituting a working fluid seal, the lip of the seal protector being of substantially smaller diameter than the body portion and extending through a part of the opening in the end wall where the diameter of the opening is less than the outside diameter of the body portion but greater than the outside diameter of the lip constituting an O-ring in said circumferential groove of the lip and being compressed radially between the lip and the surface of the opening through the cylinder wall that confronts the lip to form a barrier against entry of foreign matter into the bearing around the outside of the lip.